United States Patent
Daniels et al.

(10) Patent No.: US 7,640,307 B2
(45) Date of Patent: Dec. 29, 2009

(54) UNIVERSAL RECALLABLE, ERASABLE, SECURE AND TIMED DELIVERY EMAIL

(75) Inventors: David Lee Daniels, Haskell, OK (US); Charles Albert Handshy, Jr., Leonard, OK (US)

(73) Assignee: BigString Corporation, Red Bank, NJ (US)

( * ) Notice: Subject to any disclaimer, the term of this patent is extended or adjusted under 35 U.S.C. 154(b) by 985 days.

(21) Appl. No.: 10/827,199

(22) Filed: Apr. 19, 2004

(65) Prior Publication Data
US 2005/0267937 A1 Dec. 1, 2005

(51) Int. Cl.
G06F 15/16 (2006.01)

(52) U.S. Cl. .................. 709/206; 709/202; 709/246

(58) Field of Classification Search ........... 709/206, 709/202, 224, 246
See application file for complete search history.

(56) References Cited

U.S. PATENT DOCUMENTS

| | | | |
|---|---|---|---|
| 5,958,005 A * | 9/1999 | Thorne et al. ............. 709/202 |
| 6,065,048 A * | 5/2000 | Higley ....................... 709/218 |
| 6,185,603 B1 | 2/2001 | Henderson et al. |
| 6,310,694 B1 | 10/2001 | Okimoto et al. |
| 6,487,586 B2 | 11/2002 | Ogilvie et al. |
| 6,490,614 B1 * | 12/2002 | Shaffer et al. .............. 709/206 |
| 6,601,088 B1 | 7/2003 | Kelley et al. |
| 6,643,684 B1 | 11/2003 | Malkin et al. |
| 6,865,671 B1 * | 3/2005 | Assmann ................... 713/154 |
| 6,941,348 B2 * | 9/2005 | Petry et al. ................. 709/206 |
| 7,047,248 B1 * | 5/2006 | Tycast ....................... 707/102 |
| 2006/0101334 A1 | 5/2006 | Liao et al. |

* cited by examiner

Primary Examiner—Salad Abdullahi
Assistant Examiner—El Hadji M Sall
(74) Attorney, Agent, or Firm—Diehl Servilla LLC; Glen M. Diehl

(57) ABSTRACT

A process for secure, recallable and erasable delivery of email employing a modified sender's MTA that preprocesses email prior to sending a substituted modified email to the recipient's MTA. The sender's MTA preprocesses the email by first stripping the body from the email and creating an image file of the body and a separate image file for each attachment, then creating an entry into a data base containing the body of the email, time saved, destroy time, a field for logging time first displayed, and optionally a counter for total number of times displayable, and finally creating a link to the stored image and substituting the link for the body in the email. The recipient views the email or attachments when the link is executed. The sender can edit or delete any active email and attachments he has sent by logging onto the website of sender's HTTP S server.

7 Claims, 3 Drawing Sheets

UNIVERSAL RECALLABLE, ERASABLE, SECURE AND TIMED DELIVERY EMAIL

BACKGROUND OF THE INVENTION

1. Field of the Invention

The present invention relates to a process for secure and timed delivery of recallable and erasable email without the need for any modification to the sender's or receiver's computers other than a change of the sender's mail transport agent (MTA). This system allows the sender to control how long the e-mail is available for viewing and the number of times that the e-mail can be viewed. The present invention further allows the sender of an email to access a listing of all active e-mails that he has sent and allows the sender to then delete or edit his e-mails after he has sent them, including deleting or adding new attachments to those e-mails.

2. Description of the Related Art

Referring to FIG. 1, the standard email transmission process which is currently available to users is illustrated, as denoted by numeral 100. The currently available email transmission process 100 starts in FIG. 1 with the start box 102 and then involves a sender using his mail user agent (MUA), i.e. generally a program such as Outlook or Eudora that is installed on the sender's computer, to create and then send an email to the sender's mail transport agent (MTA), as illustrated in box 104. The sender's MTA accepts the email from its sender and then uses simple mail transport protocol (SMTP) to transfer or send the e-mail to the recipient's MTA, as illustrated in box 106. As shown in box 108, the recipient's MTA accepts the email from the sender's MTA on behalf of its local user, i.e. the recipient, and then stores the e-mail awaiting a request from the recipient for his emails. As shown in box 110, the recipient's MUA requests email from the recipient's MTA and receives email that was stored on his MTA. As shown by box 112, the process ends at this point.

Under this system of e-mail transmission, an e-mail is transferred from the sender to the recipient in whole. The recipient has an exact copy of the entire e-mail and any attachments or documents added to the email. The sender has no control over the email from the time he delivers his email to his MTA, including no control over the storage or subsequent distribution of the email by the recipient.

One problem with the current method of sending e-mails is that once the e-mail is sent, the sender has no control over the number of times and the number of people who can receive a copy of his e-mail. This unlimited distribution can has some very embarrassing and disastrous consequences, depending on the type of information contained in the e-mail and the routing of that information. The present invention addresses this problem by allowing the sender to designate both a time limit for the availability of his e-mails and also set up a numerical limit for the number of times that his e-mail can be viewed.

Another problem with this current method of sending e-mails is that the sender can not insure that his transmissions are secure. Generally, the transmission of the e-mail to the sender's MTA is not done via a secure transmission. Although this portion of the transmission could be made secure from the sender's end of the transmission, in practice it rarely is. On the other hand, once the receiver's MTA has received the e-mail, the sender has no control over the security of the transmission from the receiver's MTA to the receiver. Although the transmission of the e-mail from the receiver's MTA to the receiver could be made secure from the receiver's end, it rarely is made so. At any rate, the sender never has any control over the security of this receiver's end or portion of transmission of his e-mails. The present invention addresses this problem by providing a method and system that allows a sender to insure that all of his e-mails are sent via secure transmission, and this is done without the need for any modification to either the sender's or receiver's computers or to the software contained on those computers. The only thing that a sender must do is to change to a new Modified MTA that employs the present invention, as will be more fully explained hereafter.

Still another problem with the current method of sending e-mails is that once the e-mail is sent, the sender is powerless to modify or delete his previously transmitted e-mails or any associated files attachments to those e-mails. The present invention addresses this problem by providing the sender access to a status listing of all active e-mails that he has sent and the ability to delete or edit his e-mails after he has sent them, including the ability to delete attachments or add new attachments to the e-mails.

Still a further problem with the current method of sending emails is that the server for the sender's MTA, and possibly the recipient's MTA, can be overloaded with the current method of email transmission when a sender is sending an email with a large attachment to a large number of recipients. Because the attached document is very large, it takes up a large amount of space on the sender's MTA server. When multiple recipients are copied on the email, this multiplies the amount of space required by the sender's MTA server. Although most MTAs set an upper limit on their systems for the size of email they will accept, if an email and its attachment are not so large as to cause the sender's MTA system to reject the email, then the sender's MTA server will accept as individual emails the original email and attachment for each of the multiple recipients. This large space requirement can overload the sender's MTA server and can result in the sender's MTA server crashing. Likewise, if several of the recipients of that large e-mail and attachment employ the same MTA, then the server for recipients' MTA can likewise be overloaded by the multiple e-mail transmissions and crash.

The present invention addresses this problem by providing a modified sender's MTA that receives e-mails and their large attachments and preprocesses them as one file regardless of the number of recipients that are to be copied on the e-mail, thereby eliminating the potential for a large attachment from overloading the capacity of the servers for both the sender's and the receiver's MTA. This results in a more reliable and less vulnerable email system for everyone involved.

An additional problem with the current method of sending emails is that when a recipient opens his mail, all of the attachments to his incoming emails are automatically loaded onto his computer along with his emails. If there is a large attachment, this can greatly increase the download time and can even exceed the capacity of a computer with less storage capacity, such as a lap top computer. Also, if the attachment is a virus, the recipient's computer can be infected by the automatically downloaded attachment.

The present invention addresses this problem by allowing the recipient control over whether he receives an attachment on his computer. Employing the present invention where the content and any attachments are maintained on the HTTP S server, the recipient does not store a copy of the email or attachments automatically. The recipient only receives an attachment if he requests it. Attachments are not automatically downloaded.

SUMMARY OF THE INVENTION

The present invention is a process for delivery of email that allows a sender to send his e-mails and any attachments thereto via secure transmission without the need for any modification on the sender's or receiver's computers. The process requires modifications to the sender's MTA and does not require modifications to any other process either on the part of the sender's MUA or the recipient's MTA or the recipient's MUA.

The sender's MTA receives the sender's email. The sender's MTA stores the contents of the email in the form of an image on a hypertext transport protocol (HTTP).server. Images created as a duplicate of the sender's email message are used because they have been shown to be the most readily accepted and safest method of supplying the message to the recipient.

A link to the image is substituted in the e-mail message and sent along to the recipient's MTA as a modified email. At the same time if any attachment were in the email, they are saved on the server and links are generated as images to these as well.

When the recipient receives the e-mail, the recipient's MUA executes the link, or alternately, displays the link for the user to execute. When the link is executed, this functions to requests the image or images on behalf of the receiver from the sender's HTTP S server. If the image is still available, it is displayed in the recipient's MUA. Obviously, if the image is not available it can not be displayed. An image may be unavailable because it has been displayed the maximum number of times preset in the sender's preferences or because the removal time that was preset in the sender's preferences has been exceeded and the system has deleted the email image and any associated attachments.

With the content and any attachments maintained on the HTTP S server, the recipient does not store a copy of the email or attachments automatically. The recipient only receives an attachment if he requests it. Attachments are not automatically downloaded.

Because the content of the email is kept on a server, the server can log requests for the body of the email. The sender can examine these details and know exactly when a recipient read his email.

Also, because the content of the email is kept on the server, the sender can edit the message at any time before or after the recipient views the email as well as add, change, or delete any attachment.

The sender can also specify how long the message may be kept on the server and how may times the email may be viewed before the email is automatically deleted from the server.

BRIEF DESCRIPTION OF THE DRAWINGS

FIG. 2 shows the entire process except for the steps that can be taken by a sender to modify or delete his e-mails and attachments thereto. FIG. 3 shows the steps of the process that can be taken by a sender to modify or delete his emails and attachments thereto.

DETAILED DESCRIPTION OF THE PREFERRED EMBODIMENT

The Invention

Figure 2:
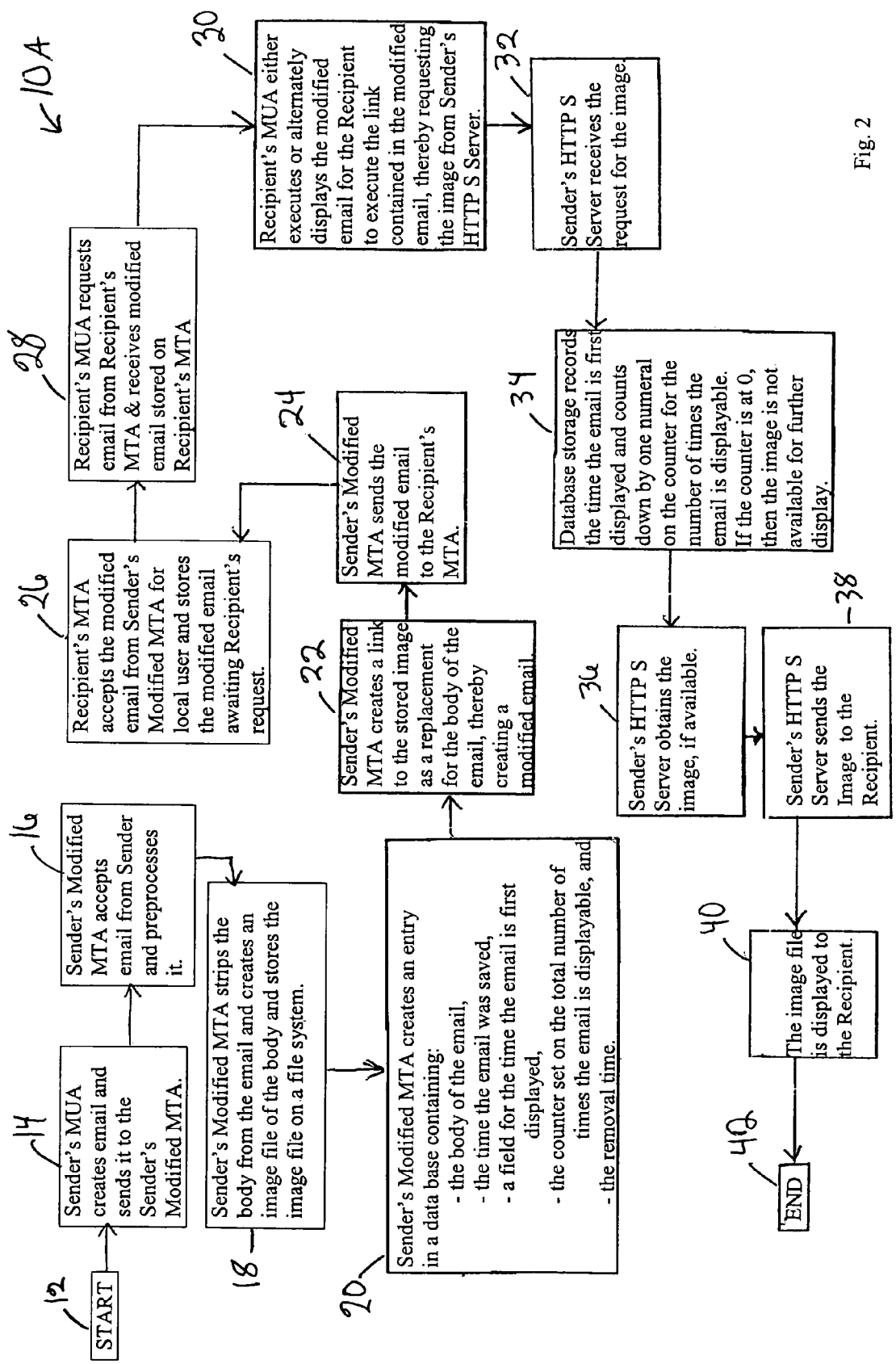
FIGS. 2 and 3 collectively show a diagram of the process for delivering email according to a preferred embodiment of the present invention.
Figure 3:
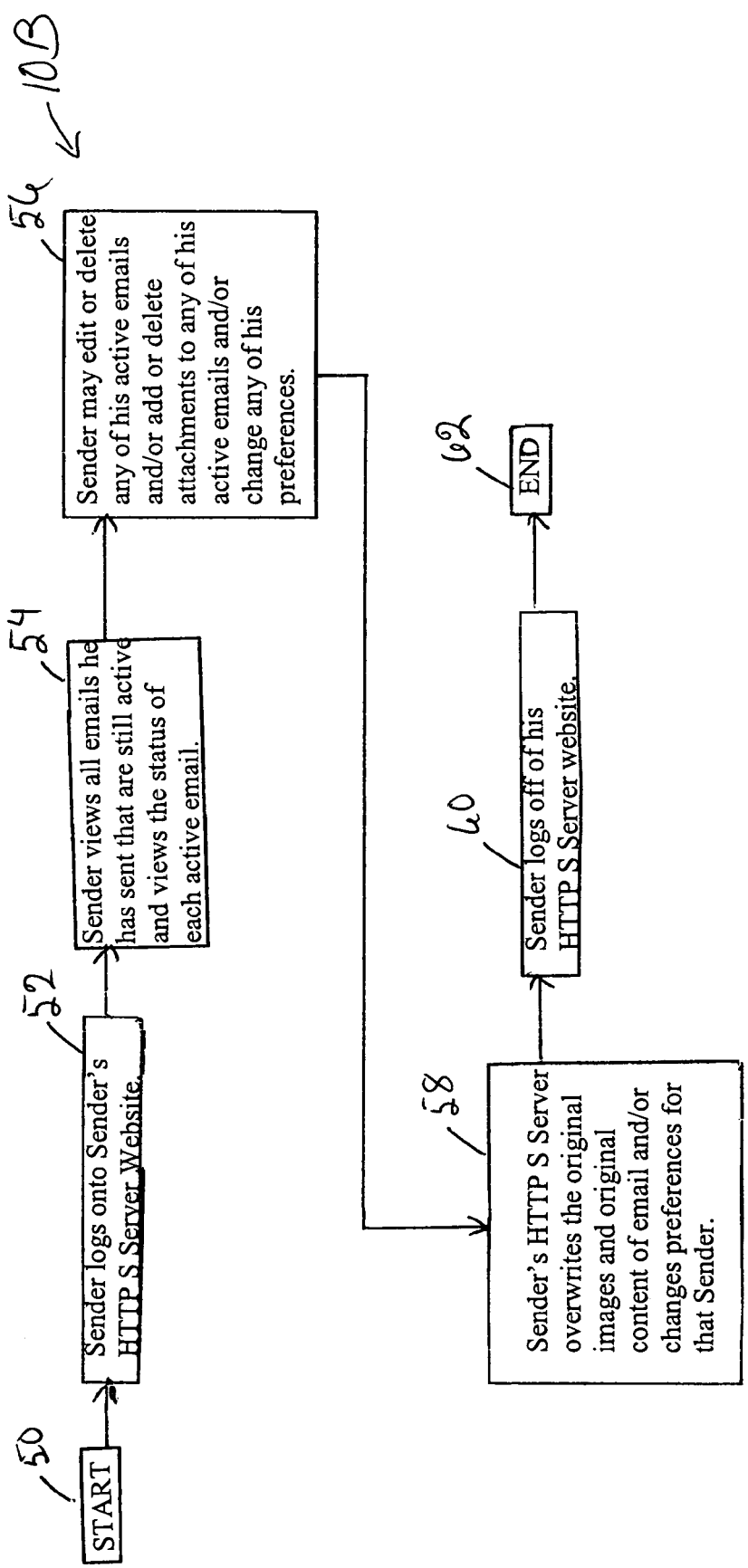

Referring now to FIGS. 2 and 3, there is illustrated a process 10 for delivery of email according to a preferred embodiment of the present invention which consists of the preprocessing and transmission steps 10A illustrated in FIG. 2 and the access and editing steps 10B available to the sender that are illustrated in FIG. 3.

But before the present process 10 is discussed in detail, the standard email transmission process currently available to users, as denoted by numeral 100, will be described in association with FIG. 1. The currently available email transmission process 100 starts in FIG. 1 with the start box 102 and then involves a sender using his mail user agent (MUA), i.e. generally a program such as Outlook or Eudora that is installed on the sender's computer, to create and then send an email to the sender's mail transport agent (MTA), as illustrated in box 104. The sender's MTA accepts the email from its sender and then uses simple mail transport protocol (SMTP) to transfer or send the e-mail to the recipient's MTA, as illustrated in box 106. As shown in box 108, the recipient's MTA accepts the email from the sender's MTA on behalf of its local user, i.e. the recipient, and then stores the e-mail awaiting a request from the recipient for his emails. As shown in box 110, the recipient's MUA requests email from the recipient's MTA and receives email that was stored on his MTA. As shown by box 112, the current process 100 ends at this point.

Under this current process 100, an e-mail is transferred from the sender to the recipient in whole. This prevents the sender from having any control over the storage or subsequent distribution of his email after he has sent it, prevents the sender from insuring that his transmissions are secure, and prevents the sender from modifying or deleting his previously transmitted e-mails or any associated files attachments to those e-mails once his email is sent. Also, from the receiver's end, the current process 100 prevents the receiver from controlling the downloading of attachments to his incoming emails. Finally, for the MTAs that serve senders and receivers, the current process 100 prevents them from insuring that their systems are not overloaded when a sender is sending an email containing a large attachment to a large number of recipients. The present invention addresses all of these problems.

As will become apparent from the discussion that follows, the present process 10 allows a sender to send his e-mails and any attachments thereto via secure transmission without the need for any modification to either the sender's or receiver's computers. The present process requires only modifications to the sender's MTA and does not require modifications to the sender's MUA, the recipient's MTA, or the recipient's MUA.

Figure 1:
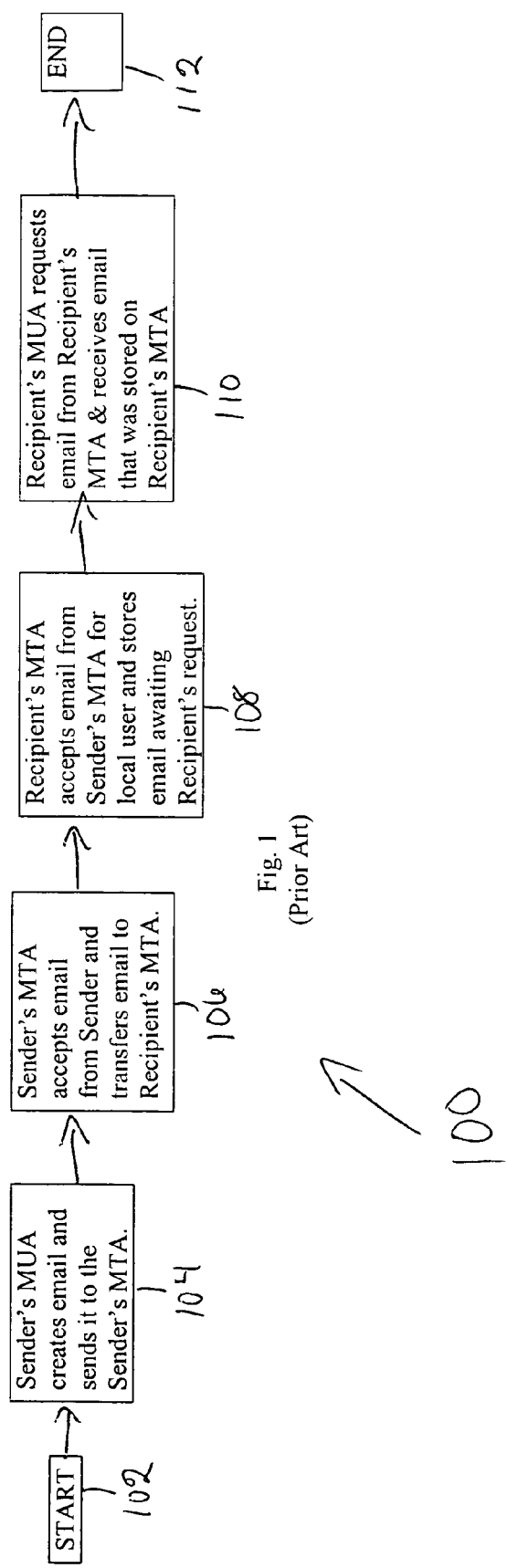
FIG. 1 is a diagram showing the prior art method for transmitting emails between a sender and a receiver.

Referring now to FIG. 1, the preprocessing and transmission steps 10A of the present process 10 will be described. The process 10 begins at the start box 12, and as shown in box 14, the sender's MUA creates an email which may or may not include attachments. The sender's MUA then sends the email and any associated attachments to the sender's modified MTA. The step illustrated in box 14 is identical to step 104 shown in FIG. 1 except that the sender's MUA sends the email to a modified MTA in the present process 10 and transmission from the Sender's MUA to the Sender's Modified MTA is via a secure transmission. As shown in box 16, the sender's modified MTA accepts or receives the sender's email and preprocesses it.

Boxes 18, 20, 22 and 24 show the preprocessing that is done by the sender's modified MTA to the email before the modified email is sent to the Recipient's MTA. First, as illustrated in box 18, the sender's modified MTA strips the body from the email and creates an image file of the body which it stores on a file system that is accessible by a secure hypertext transport protocol (HTTP S) server, as will be more fully described later in this discussion. Images created as a duplicate of the sender's email message are used because they have been shown to be the most readily accepted and safest method of supplying the message to the recipient.

Next, as illustrated by box 20, the sender's modified MTA creates an entry in a data base containing the body of the email, the time that the email was saved to the data base, a blank field reserved for entering the time that the email is first displayed to a recipient, a counter set on the total number of times the email is displayable, and a removal time. Both of the latter two parameters, i.e. the total number of times the email is displayable, and the removal time, were previously specified by the sender when the sender set up his account with sender's modified MTA. However, these two parameters can be modified by the sender at any time, either by imbedding a command within an email that will change these parameters for only that one email or alternately by the steps that are illustrated in and will be described hereafter in association with FIG. 3 that will change these parameters for some or all of the currently active emails and/or future emails originating from that sender.

As illustrated in box 22, the sender's modified MTA then creates a link to the stored image as a replacement for the body of the original email, thus creating a modified email as a replacement for the original email. Box 24 shows that the sender's modified MTA then sends the modified email to the recipient's MTA. This ends the preprocessing of the email and the modified email is now transmitted.

Box 26 shows the recipient's MTA accepting the modified email from the sender's modified MTA for its local user who is the recipient designated by the sender on the email. The recipient's MTA stores the modified email and waits for the recipient to request his emails. The step shown in box 26 is identical to the step shown in box 108 except the email that is received in box 26 is received from sender's modified MTA and has been previously modified by sender's modified MTA by substituting a link to the image for the original body of the email. Box 28 shows the recipient's MUA requesting email from the recipient's MTA and receiving the modified email that was stored on the recipient's MTA.

As shown in Box 30, either the recipient's MUA automatically executes the link contained in the modified email, or alternately, the recipient's MUA displays the modified email for the recipient to execute the link contained in the modified email. Once the link has been executed, this requests the image from the sender's HTTP S server. Box 32 shows that the sender's HTTP S server receives the request for the image.

Box 34 shows that database storage records the time the email is first displayed and counts down by one numeral on the counter for the number of times the email is displayable. If the counter is already at zero, then the image is not available for further display. Assuming that the counter is not already at zero, then box 36 shows that the sender's HTTP S server obtains the image, if available. In addition to the image not being available in box 34 due to it having already been displayed too many times, the image may also not be available because the removal time has been exceeded for the email.

Assuming that the removal time has not been exceeded and the image is available, then the sender's HTTP S server sends the image to the recipient, as shown in box 38. At the same time if any attachment were attached in the email, they are saved on the server and links are generated as images to these attachments as well.

Box 40 indicates that the image file is displayed to the recipient. Again this is done via a secure transmission controlled by the sender's HTTP S server. With the content and any attachments maintained on the server, the recipient does not store a copy of the email or attachments automatically.

The recipient only receives an attachment if he requests it. Attachments are not automatically downloaded. Box 42 indicates that the preprocessing and transmission steps 10A illustrated in FIG. 2 end at this point.

Referring now to FIG. 3, the access and editing steps 10B are available to the sender at any time regardless of whether or not an email has already been seen by the recipient. Beginning at the start box 50, the sender logs onto the website for sender's HTTP S server, as indicated by box 52. On the sender's HTTP S server website the sender can view all of the emails he has sent that are still active and can view the status of each active email, including when the email was first displayed to the recipient and how may times the email has been displayed, as shown in box 54. This is possible because the content of the email is kept on a server, the server can log requests for the body of the email. The sender can examine these details and know exactly when a recipient read his email.

Also, as shown in box 56, because the content of the email is kept on the server, the sender can edit or delete any active email message at any time before or after the recipient views the email as well as add, or delete any attachments. The sender can also change his preferences at this time to specify a different length of time that the message may be kept on the server and to specify a different number of times the email may be viewed before the email is automatically deleted from the server.

Box 58 shows that the sender's HTTP S server overwrites the original images with the now revised email and its associated new attachments and changes the preferences setting for that sender. The sender logs off of his HTTP S server website in box 60 and the access and editing steps 10B are ended at box 62.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A process for secure and timed delivery of recallable and erasable email comprising: a sender's mail user agent creating and sending an email having a body to a sender's modified mail transport agent, said sender's modified mail transport agent preprocessing said email to create a modified email that has a link to a stored image of the body from the email substituted for the body of the email, sender's modified mail transport agent sending the modified email to a recipient's mail transport agent where the modified email is stored awaiting recipient's request, recipient's mail user agent requesting and receiving said modified email from recipient's mail transport agent, executing the link contained in the modified email to request the image of the body of the email from sender's hypertext transport protocol server, sender's hypertext transport protocol server obtaining the image and sending the image to the recipient, and the displaying the image of the body of the email for the recipient, the step of said sender's modified mail transport agent preprocessing said email to create a modified email that has had a link to a stored image of the body from the email substituted for the body of the email further comprises: sender's modified mail transport agent strips the body from the email and creates an image file of the body and stores the image file on a file system, sender's modified mail transport agent creates an entry for the email in a database, and sender's modified mail transport agent creates a link to the stored image and substitutes the link in the email for the body of the email thereby creating a modified email, wherein the entry created in the database by the sender's modified mail transport agent for the email further comprises: the body of the email, a time the email was saved, a time the email is first displayed, a total number of times the email is displayable. and a removal time, and the mail transport agent removes the email based on total number and removal time.

2. A process for secure and timed delivery of recallable and erasable email according to claim 1 wherein sender's mail user agent employs a secure transmission in sending the email to the sender's modified mail transport agent, and sender's hypertext transport protocol server employs a secure transmission in sending the image to the recipient.

3. A process for secure and timed delivery of recallable and erasable email according to claim 1 further comprising the following steps which occur after the step of executing the link contained in the modified email to request the image of the body of the email from sender's hypertext transport protocol server: sender's hypertext transport protocol server receiving the request for the image from the recipient, and the database recording the time the email is first displayed and counts down one numeral on the counter for the total number of times the email image is displayable.

4. A process for secure and timed delivery of recallable and erasable email according to claim 3 further comprising the following steps which can occur at any time: sender logging onto the website for sender's hypertext transport protocol server, sender viewing all active emails that he has sent and the status of each, sender editing his active emails and editing his preferences, the sender's hypertext transport protocol server overwriting the original image files and original content of the email and changing sender's preferences, and sender logging off of the website.

5. A process for secure and timed delivery of recallable and erasable email according to claim 1 further comprising the following steps that can be performed at any time: sender logging onto a website for sender's hypertext transport protocol server, sender viewing all active emails that he has sent and the status of each, sender editing his active emails, the sender's hypertext transport protocol server overwriting the original image files and original content of the email, and sender logging off of the website.

6. A process for secure and timed delivery of recallable and erasable email comprising: a sender preselecting with sender's hypertext transport protocol server the sender's preferences for the number of times his emails will be displayable and for the length of time his emails will remain active and available for viewing, a sender's mail user agent creating and sending an email to a sender's modified mail transport agent, said sender's modified mail transport agent preprocessing said email by taking the body from the email and creating and storing an image of the body on a file system and then creating a link to the image that is inserted back into the email as a replacement for the body of the email to form a modified email, sender's modified mail transport agent creates an entry for the email in a database containing the body of the email and time saved along with the sender's preselected preferences and a blank field for recording the time the email is first displayed, sender's modified mail transport agent sending the modified email to a recipient's mail transport agent where the modified email is stored awaiting recipient's request, recipient's mail user agent requesting and receiving said modified email from recipient's mail transport agent, recipient executing the link contained in the modified email to request the image of the body of the email from sender's hypertext transport protocol server, the database recording the time the email is first displayed and counting down on the counter for the total number of times the email is displayable, sender's hypertext transport protocol server obtaining the image and sending the image to the recipient, and the image displayed for the recipient, and wherein the entry created in the database by the sender's modified mail transport agent for the email further comprises: the body of the email, a time the email was saved, a time the email is first displayed, a total number of times the email is displayable, and a removal time, and the mail transport agent removes the email based on total number and removal time.

7. A process for secure and timed delivery of recallable and erasable email according to claim 6 further comprising the following steps that can be performed at any time: sender logging onto a website for sender's hypertext transport protocol server, sender viewing all active emails that he has sent and the status of each, sender editing his active emails, the sender's hypertext transport protocol server overwriting the original image files and original content of the email, and sender logging off of the website.

* * * * *